April 27, 1937. D. H. HILL Re. 20,339

CLEANER FOR OIL BURNERS

Original Filed Feb. 14, 1931 2 Sheets-Sheet 1

Inventor:
Dewey H. Hill
by Albert J. Cheibb
Attorney

April 27, 1937. D. H. HILL Re. 20,339

CLEANER FOR OIL BURNERS

Original Filed Feb. 14, 1931 2 Sheets-Sheet 2

Inventor:
Dewey H. Hill
by Albert Scheible
Attorney

Reissued Apr. 27, 1937

Re. 20,339

UNITED STATES PATENT OFFICE 20,339

CLEANER FOR OIL BURNERS

Dewey H. Hill, Macomb, Ill., assignor to Globe American Corporation, Kokomo, Ind., a corporation of Indiana Original No. 1,982,303, dated November 27, 1934, Serial No. 515,742, February 14, 1931. Application for reissue May 21, 1936, Serial No. 81,132

12 Claims. (Cl. 126—95)

My invention relates to the class of burners in which the flame issues over the top of an annular wall so that carbon deposits are apt to form on such a wall top during the use of the burner, and in its general objects aims to provide simple and conveniently operated means whereby such deposits can be scraped off, without interrupting the operation of the burner and by manipulation at a distance from the burner.

In one of its more particular objects, my invention relates to the class of burners in which the upper portion of an annular fuel trough houses a so-called vaporizing ring, which ring has portions thereof so close to the inner faces of the riser walls of the trough as to present exceedingly narrow tubular passages through which the fuel vapor issues. In the commercial manufacture of such burners, these riser walls of the trough and the adjacent edge portions of the vaporizing ring cannot be economically manufactured with such a degree of precision as to present accurately formed and exactly concentric opposed walls.

Consequently, the width of each such vapor passage (radially of the annular trough) is not precisely equal along the entire circumference of that passage, so that the rate at which vapor issues from different circumferentially spaced portions of each such passage will vary somewhat. As the result of this variation, the combustion is not equally complete in all circumferential portions of the flame accruing from the vapor which issues from each such tubular passage, so that deposits of carbon are apt to form at portions of the mouth of each such passage, and also on trough wall portions adjacent to the mouth portions of the vapor passages. My invention aims to reduce the deleterious action of such carbon deposits by providing simple means whereby the vaporizing ring of such a burner may be rotated to dislodge and distribute at least a considerable portion of these deposits, and whereby this rotation of the vaporizing ring may be effected without halting the operation of the burner or otherwise interfering with the normal use of the appliance in connection with which the burner is used.

In another important object, my invention relates to the class of annular burners in which at least a part of the flame issues between a flame spreader and an annular burner portion spaced downwardly from this flame spreader. In such burners, carbon deposits are apt to form on upper edge of such a burner portion, and my invention aims to provide simple and easily operated means for scraping such deposits off the said edge. Furthermore, my invention aims to provide a simple arrangement whereby this scraping can be effected by integral parts of the flame spreader through a rotation of the latter.

In still another object, my invention relates to heaters or other burner-equipped appliances in which the flame issues into a combustion chamber over the top of an annular wall on which deposits are apt to form, and aims to provide simple means for scraping off such deposits, by means operable from outside the said heater or other apparatus.

More particularly, my invention aims to provide the flame-spreader of a burner with scraper elements adapted to remove such deposits when the flame-spreader is rotated, to provide means whereby the flame-spreader can be rotated by an operating member extending through the lid of the combustion chamber, whereby the flame-spreader can readily be lifted out of the said chamber by a raising of the said operating member to permit a cleaning of the flame-spreader, and whereby the said lid can also be lifted off its normal position by a sufficient raising of the operating member. So also, my invention aims to provide a simple and inexpensive construction of the needed parts for the above recited purpose, and one in which the flame-spreader will easily be guided to its normal operative position when it is again lowered.

Still further and also more detailed objects will appear from the following specification and from the accompanying drawings, in which Fig. 1 is a vertical and central section through a drum type heater including an embodiment of all features of my invention, with the flame-spreader and the actuating member both shown in their normal positions.

Figure 1:
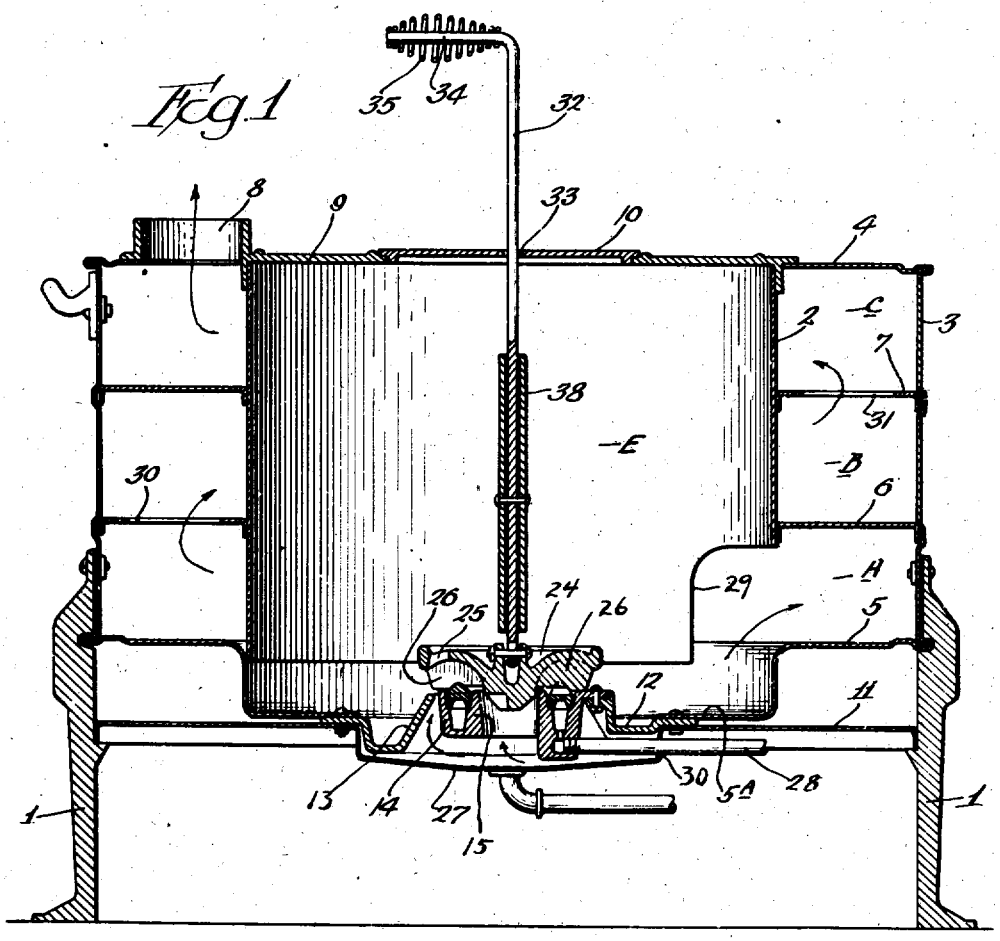
Figure 4:
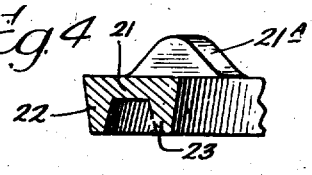
Fig. 4 is an enlarged perspective view of a portion of the vaporizing ring.
Figure 5:
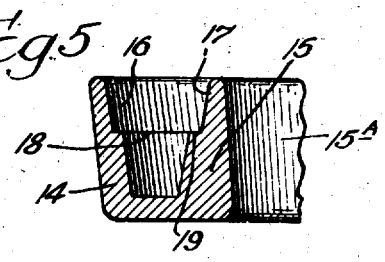
Fig. 5 is a similarly enlarged view of the oil trough.

In Fig. 1, I am showing a heater including an annular drum supported by legs 1, this drum having an inner cylindrical wall 2 and an outer cylindrical wall 3, an annular top 4 and an annular bottom 5. The annular space confined by these parts 2 to 5, inclusive, is divided into three superposed compartments A, B and C by horizontal annular floors 6 and 7, and a flue collar 8 defines an upward outlet from the uppermost compartment C. This collar is here shown as integral with a centrally perforated top plate 9 which, together with a lid 10 socketed in its perforation, constitutes the upper end of a cylindrical combustion chamber E which has the said inner tubular wall 2 as its peripheral wall and which has a depressed extension 5A of the drum bottom 5 as the bottom of the chamber.

Figure 2:
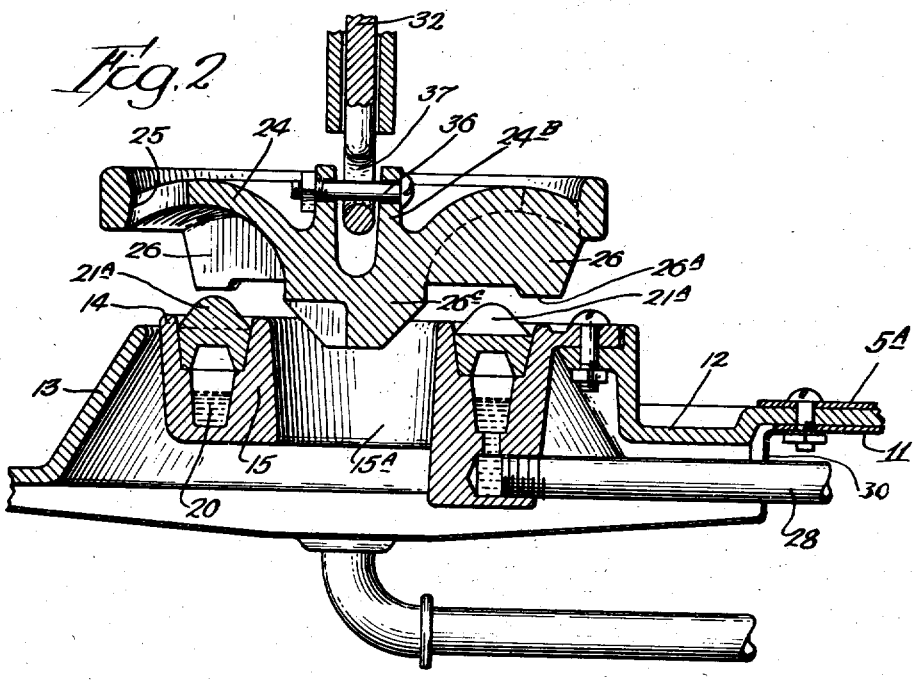
Fig. 2 is an enlargement of the sections of the oil trough, vaporizing ring and adjacent portions in Fig. 1, with the flame-spreader raised somewhat from its normal position.
Figure 3:
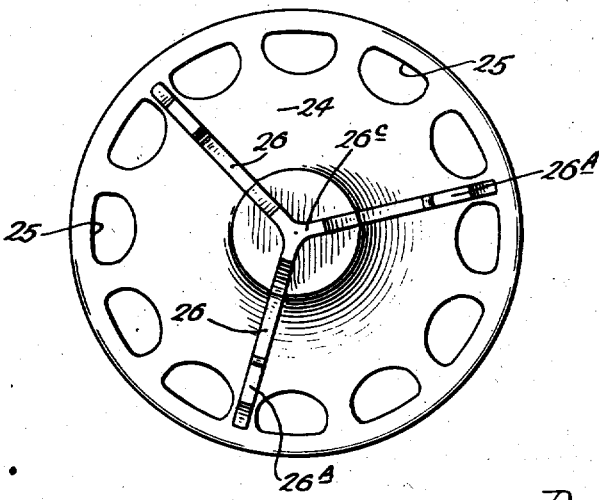
Fig. 3 is a bottom view of the flame-spreader, drawn on the same scale as Fig. 2.

Supported conjointly by this chamber bottom 5A and by an annular false bottom 11 is a burner support 12 which has the major part of its inner portion formed to afford an upwardly tapering air-confining wall 13, as shown in Figs. 1 and 2. Supported by the burner support 12 is an annular oil trough which has the major portion of its outer wall 14 spaced radially inward from the upper end of the air-confining wall 13 and extending higher than the latter, while the inner trough wall 15 has a tubular inner face 15A defining a central air inlet for the burner.

The opposed interior walls of the oil trough slope downward toward each other, and the outer of these walls 16 as well as the inward trough wall 17 each is formed to present horizontal ledge 18, 19 at the same level within the trough; thereby dividing the trough into a lower portion for receiving the oil (or other liquid fuel) 20, and a wider upper portion for receiving a vaporizing ring 21 which has inner and outer depending flanges respectively seated on the said shoulders or ledges 18 and 19. This ring is of such a cross-section (radially of the ring) that its inner and outer walls are closely adjacent respectively to the said upper portions of the trough walls 17 and 16 when the depending flanges 22 and 23 are respectively seated on the said shoulders or ledges 18 and 19; and the height of the vaporizing ring is less than the depth of the trough portion above these ledges, so that the inner trough wall 15 and more particularly the outer trough wall 14 extends higher than this ring.

Extending above the said trough and ring, and of larger diameter than the exterior wall of the trough, is a flame-spreader 24 which is provided near its periphery with a plurality of apertures 25 and which has a plurality of radial webs 26 depending from it. Each of these webs normally is seated on the upper edge of the outer trough wall but extends freely above the inner trough wall 15, as shown in Fig. 1. A drip pan 27 under-hangs the burner and has a lateral opening 30, through which air is admitted along the lines shown by the arrows in Fig. 1 both to the central air passage bordered by the inner trough wall 15 and to the annular space between the air-confining collar 13 and the outer trough wall 15.

When the burner is in operation, with oil supplied through an oil duct 28 to the lower part of the trough, as shown at 29 in Fig. 2, the heat radiated from the metal trough and the vaporizing ring (after the burner is lighted) gradually vaporizes the oil in the space within the trough above the oil and below the vaporizing ring. The resulting vapor pressure forces this vapor past the ring through the crevices between the ledges 18 and 19 and the depending flanges on the ring, and through the crevices (or annular passages) between the inner and outer walls of the ring and the respectively adjacent upper portions of the opposed trough walls, sufficient crevices being afforded between the ring and the ledges by the irregularities of the adjacent surfaces in the usual manufacture of such parts.

Consequently, the oil vapor issues in two tubular formations adjacent to the upper ends of the inner and outer walls of the vaporizing ring, and its admixture with the air produces two annular flames. These flames issue partly through the apertures 25 in the flame-spreader 24, but for the most part are deflected radially outward of the burner by this flame-spreader so as to direct them toward the peripheral wall 2 of the combustion chamber.

The combustion gases then pass into the lower drum compartment A through a port 29 in the said wall 2 and travel in the form of two oppositely directed streams to the opposite side of the drum, where a port 30 in the annular floor or drum partition 6 admits these gases to the middle drum compartment B. After again passing halfway around the drum, the gases flow through a port 31 in the partitioning floor 7 to the uppermost compartment C, from which they issue through the flue collar 8.

Operatively connected to the flame-spreader 24, and preferably coaxial with the latter, is an actuating member comprising an upright stem 32 which extends through a perforation 33 in the lid 10 and desirably to a point considerably above this lid. This rod has at its upper end a horizontally extending arm 34, which arm is desirably housed by a spiral handle 35. The stem 32 of the actuating member desirably is permanently connected to the flame-spreader, as by a bolt 36 extending through lugs 24B on the flame-spreader and through an eye 37 on the lower end of the said stem, and the major portion of the stem 32 below the lid 10 is desirably housed loosely by a metal tube 38 to shield the stem from the flames. Moreover, the perforation 33 in the lid is preferably smaller in diameter than the exterior of the shielding tube 38, so that the upper end of this tube will engage the lower face of this lid when the actuating member has been lifted to a predetermined extent, thereby permitting the user to raise the lid also by lifting the handle 35.

Figure 6:
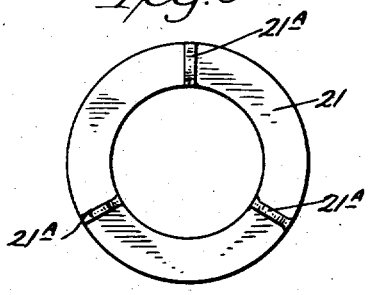
Fig. 6 is a plan view of the vaporizing ring, drawn on a smaller scale than Figs. 2 and 3.

Projecting upward from the vaporizing ring 21 are a plurality of lugs 21A, which lugs reach above the lower end face portions 26A of the webs 26 on the flame-spreader when these portions are seated on the outer trough walls 14 as in Fig. 1. These lugs are desirably spaced circumferentially of the vaporizing ring similar to the spacing to the said web portions, as shown in Fig. 6, so that each lug will be engaged by one of the said webs when the flame-spreader is rotated, whereby a further rotation of the flame-spreader in the same direction will cause the vaporizing ring to rotate with it.

When the heater of Fig. 1 is in use, a lifting of the handle 35 (to an extent somewhat greater than the downward spacing of the shield tube 38 from the lid 10) will raise this lid also, thereby enabling the user to see the flame within the combustion chamber E. When the appearance of this flame indicates that undesirable carbon deposits have formed on the burner, the flame spreader is lowered back to its normal position on the burner and the stem 32 is then rotated about its own axis, this being easily done by using the handle 35 as a crank. Thus, the manually rotatable part of the burner assembly serves continuously as a flame spreader member when the burner is in operation, and also serves as a scraper member when this burner part is rotated.

During this rotation, the portions of the flame-spreader webs 26 which are seated on the outer burner wall will scrape any deposits off the top of this wall; and the rotation of the vaporizing ring will loosen any carbon adjacent to the upper ends of its inner and outer walls. Consequently, the draft of the burner will cause these particles of carbon to be blown into the combustion chamber with the flame, particularly when these particles are relatively small.

Moreover, the user can at any time lift the flame-spreader entirely out of the heater by sufficiently lifting the handled actuating member, thereby making it easy for him to scrape or otherwise clean both the lower face of the flame-spreader and the walls of the spreader perforations 25, if this is needed.

To facilitate the centering of the flame-spreader with respect to the burner when it is again lowered after having been raised off the trough, I preferably connect the inner ends of the webs 26 to form a downwardly tapering nub 26C having an effective exterior diameter slightly smaller than the upper end of the air-bore forming inward through face 15A. However, I do not wish to be limited to this or other details of the construction and arrangement above disclosed, since changes may obviously be made without departing either from the spirit of my invention or from the appended claims. So also, I do not wish to be limited to the employment of my invention in connection with a drum type of heater, nor to the conjoint use of various novel features of my invention.

The invention claimed is:

1. In an oil burner, an annular oil trough, a vaporizing ring disposed within the trough and above the bottom of the trough and affording a vapor passage between each riser side of the ring and the adjacent wall of the trough; a member overlying the said ring; the said member including a flame spreader coaxial with the trough, and spacer elements depending from the flame spreader and spaced circumferentially of the trough and normally seated on the trough; and means operable to rotate the flame spreader member; the vaporizing ring and the flame spreader member having parts interengaging to cause a rotation of the flame spreader to rotate the vaporizing ring with it.

2. In a heater, a top portion including a lid provided with a perforation, a burner including an annular fuel trough disposed below and substantially coaxial with the said perforation, scraper means supported for rotation about the axis of the trough and including a scraper element normally seated on the trough; and an actuating member connected to the scraper means and extending through the said perforation, for rotating the scraper means; the actuating member having a portion thereof disposed for engaging the lid when the actuating member is lifted.

3. A heater assemblage as per claim 2, including a tube housing a portion of the actuating member so as to shield that portion against excessive heat from the flame of the burner.

4. In a heater, a top portion provided with a perforation, a burner including an annular fuel trough disposed below and substantially coaxial with the said perforation, a flame spreader overlying the said trough and supported for rotation about the axis of the trough the flame spreader including scraper elements normally seated on the trough, and an actuating member fastened at its lower end to and supported by the flame spreader, the actuating member extending continuously during the operation of the heater through the said perforation and presenting a handle spaced upward from the said top portion for permitting the flame spreader to be rotated from the exterior of the heater while the said top portion of the heater is in its normal position.

5. In an oil burner, an annular oil trough, a vaporizing ring support in the said trough above the bottom of the trough and below the top of the walls of the trough, and cooperating with the walls of the trough to afford vapor passages therebetween; a flame spreader coaxial with and freely overlying the trough; spaced webs depending from the flame spreader and normally seated on the outer wall of the trough, the said webs extending freely above the inner wall of the trough; and lugs extending upwardly from the vaporizing ring to an elevation above that of the top of the said outer trough wall; the said lugs being adapted to be engaged by the webs of the flame spreader when the latter is rotated, so as to cause rotation of the flame spreader to rotate the vaporizing ring also.

6. An oil burner as per claim 4, in which the flame spreader includes a part depending into the space surrounded by the inner wall of the annular oil trough, the said part serving to center the flame spreader with respect to the oil trough when the flame spreader is being placed in position on the trough.

7. In a heater having a combustion chamber therein and having a lid in the top of the said chamber, a liquid fuel burner disposed within the combustion chamber and including an upwardly facing annular burner portion including a wall upon which carbon is apt to deposit during the operation of the burner; a scraper member having only widely spaced portions thereof continuously seated on the said burner portion during the operation of the burner; an actuating member extending downwardly through the lid into the heater and operable from the exterior of the heater for rotating the scraper member without interrupting the operation of the burner, and lid-lifting means associated with the actuating member and disposed for engaging the lid so as to cause a raising of the operating member to raise the lid also.

8. In a heater having a combustion chamber therein and having a lid in the top of the said chamber, a liquid fuel burner disposed within the combustion chamber and including an upwardly facing annular burner portion including a wall upon which carbon is apt to deposit during the operation of the burner; a scraper member having only widely spaced portions thereof continuously seated on the said burner portion during the operation of the burner; an actuating member extending downwardly through the lid into the heater and operable from the exterior of the heater for rotating the scraper member without interrupting the operation of the burner; means connecting the scraper member to the actuating member whereby a lifting of the actuating member will lift the scraper member off the burner, and means associated with the actuating member whereby the lifting of the actuating member will raise the lid also.

9. In a heater, a top portion provided with a perforation, a burner including a fixed annular fuel trough positioned below and substantially coaxial with the said perforation, a rotatable vaporizing ring supported in said trough, a rotatable flame-spreader overlying said trough and ring and supported for rotation about the axis of said trough, means engaging said flame-spreader with the ring and means operable selectively to lift the flame-spreader from the trough and ring, or rotate both the flame-spreader and the engaged ring for scraping said trough, said last-mentioned means extending continuously during the operation of the heater through said perforation and presenting a handle spaced upwardly from the said top portion for permitting the flame spreader and ring to be rotated from the exterior of the heater while the said top portion of the heater is in its normal position.

10. In an oil burner, an annular fixed oil trough, a rotatable vaporizing ring therein, a rotatable flame-spreader, means for engaging the flame-spreader with the ring, said ring being normally seated in said trough, and means operable selectively to lift the flame-spreader from the trough and ring, or rotate both the flame-spreader and the engaged ring for causing said ring to dislodge foreign deposits from said trough.

11. In an oil burner, an annular oil trough, a vaporizing ring disposed within the trough and above the bottom of the trough and affording a vapor passage between each riser side of the ring and the adjacent wall of the trough; a member overlying said ring; the said member including a flame spreader coaxial with the trough, and means operable to rotate the flame spreader member; the vaporizing ring and the flame spreader member having parts interengaging to cause a rotation of the flame spreader to rotate the vaporizing ring with it.

12. An oil burner including an annular trough, a vaporizing ring member rotatably disposed within said trough and affording a vapor passage between each riser side of the ring and the adjacent wall of the trough, said ring adapted when rotated to dislodge foreign deposits from said burner, a rotatable flame spreader separate from and overlying said ring, and cooperating means upon said spreader and ring whereby rotary movement applied to the spreader will be transmitted to the ring.

DEWEY H. HILL.